F. D. WILSON.
BUNDLE CARRIER FOR CORN HARVESTERS.
APPLICATION FILED MAR. 16, 1915.
1,208,873.
Patented Dec. 19, 1916.
3 SHEETS—SHEET 3.
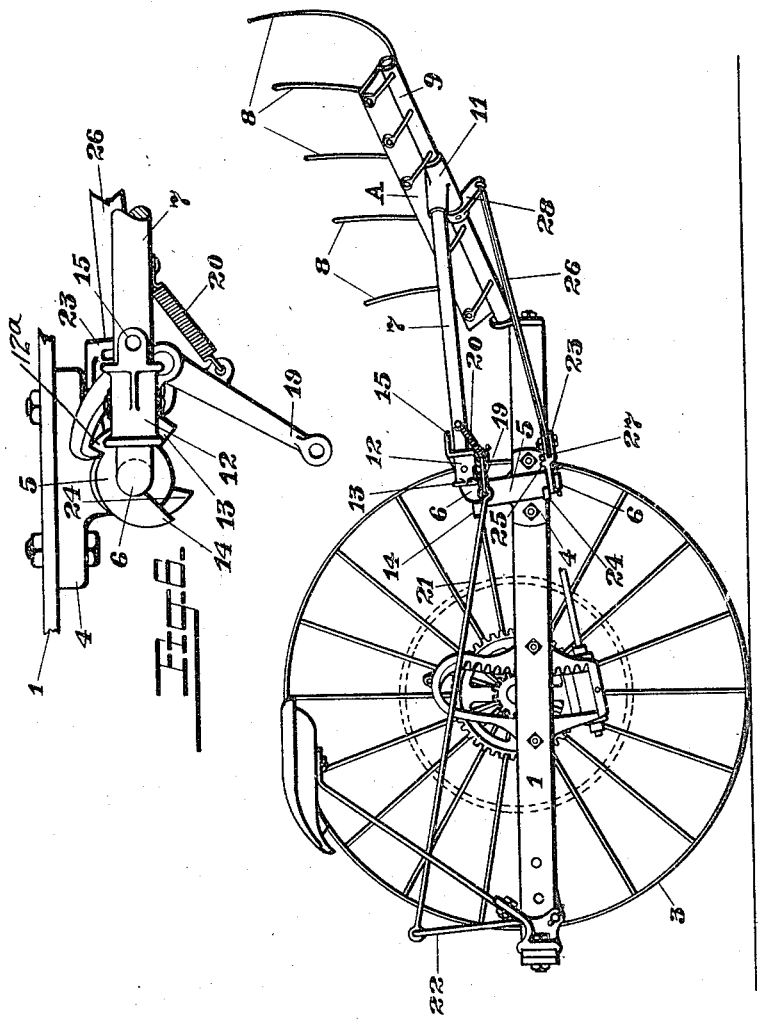

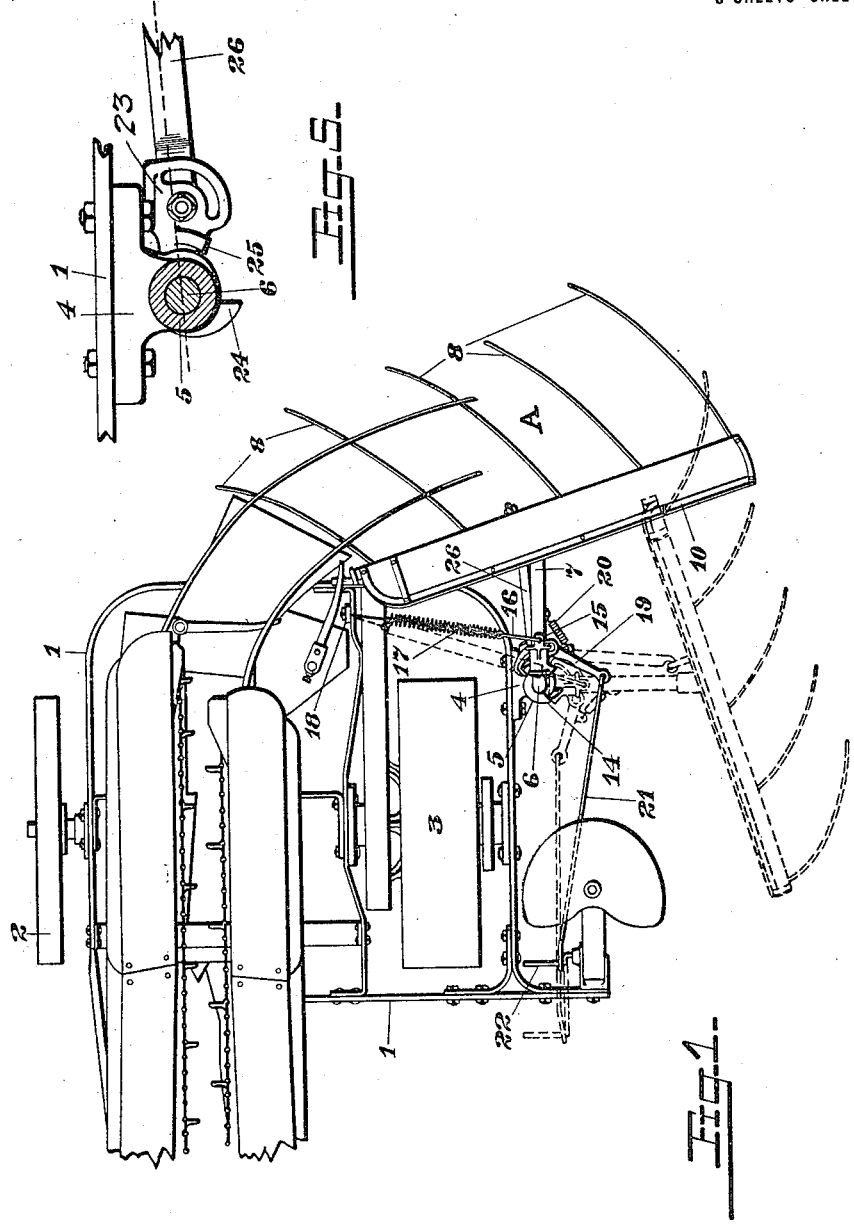

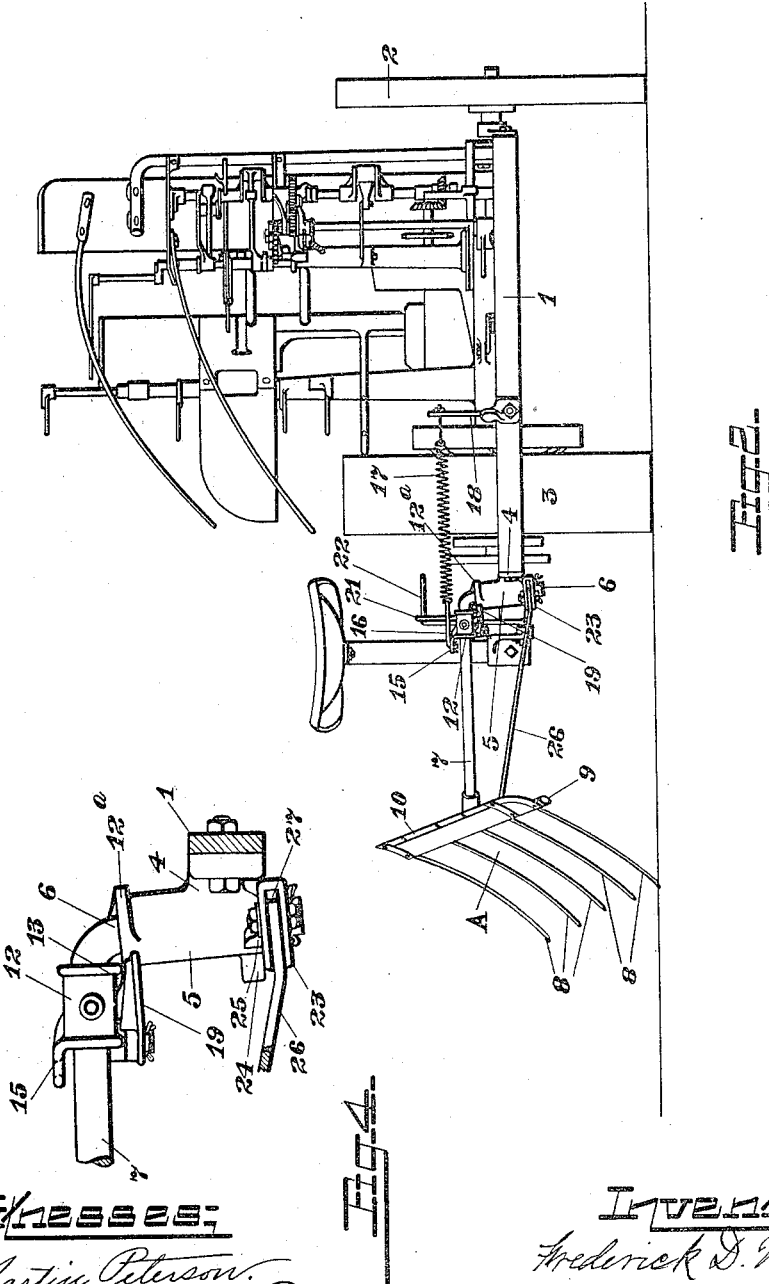

UNITED STATES PATENT OFFICE.

FREDERICK D. WILSON, OF MOLINE, ILLINOIS, ASSIGNOR TO DEERE & COMPANY, OF MOLINE, ILLINOIS, A CORPORATION OF ILLINOIS.

BUNDLE-CARRIER FOR CORN-HARVESTERS.

1,208,873.  Specification of Letters Patent.  Patented Dec. 19, 1916.

Application filed March 16, 1915. Serial No. 14,858.

*To all whom it may concern:*

Be it known that I, FREDERICK D. WILSON, a citizen of the United States, residing at Moline, in the county of Rock Island and State of Illinois, have invented certain new and useful Improvements in Bundle-Carriers for Corn-Harvesters, of which the following is a specification, reference being had therein to the accompanying drawing.

My invention relates to corn harvesters of a type designed to cut and harvest corn, and more particularly to that type of machine by which the corn is cut and conveyed, in an upright position to an upright binder located on the rear of the machine where the bundles are bound and deposited in a carrier adapted to receive a number of bundles, and operated at will to deposit the accumulated bundles on the ground.

The object of my invention is to provide a bundle carrier simple in construction and effectively operative to deposit the bundles stubbleward of the harvester and at a distance therefrom to be out of the way of the team when harvesting the next adjacent row of corn.

Referring to the drawings in which similar numerals indicate identical parts: Figure 1 is a plan view of the rear end of a corn harvester, showing the carrier in normal receptive position, and in dotted lines the position of the parts just as the bundle is being dumped. Fig. 2 is a rear view of Fig. 1 showing the carrier in dumping position. Fig. 3 is an enlarged side elevation in part showing more clearly the manner of mounting the carrier upon the harvester, and the location of the operating parts when the carrier is in a position to receive bundles. Figs. 4, 5 and 6 are details.

A main frame 1 is supported on a grain wheel 2 and a main wheel 3, the latter furnishing the necessary power to actuate the operative parts of the harvesting and binding mechanism. Rigidly secured to the stubbleward side of the main frame is a casting 4, including a sleeve 5, the vertical axis of which is inclined slightly forward. Journaled in the sleeve 5, and free to oscillate therein when the bundle carrier is operated, is a downwardly bent end 6 of a bundle carrier support 7, which is preferably parallel with the line of advance of the harvester.

The bundle carrier A consists of a receiver comprising a series of fingers 8 secured to a finger bar 9 and extending beyond it where they are joined to a brace bar 10 each end of which is bent and secured to the finger bar 9; the finger bar 9 is journaled in a bearing 11 firmly secured on the rearward end of the sheaf carrier support 7, and is adapted to rock therein when the carrier is actuated to deposit bundles upon the ground or when it is returned to its normal receptive position.

Rigidly mounted on the bundle carrier support 7, adjacent the bend thereof, is a sleeve 12 having a lug 13 nearest the bend adapted to contact with a similar lug 14 on the sleeve 5 in which the bent end of the support 7 is journaled. This contact limits the forward sweep of the carrier when it is actuated to dump the accumulated bundles. On the opposite end of the sleeve 12, farthest from the bend, is an eye 15 with which engages the hook end of a link 16 to the other end of which is connected a coil spring 17. This spring exerts its tension between the sleeve 12 and a standard 18 secured to the frame of the harvester, to which the other end of the spring is connected, and is utilized to return the bundle carrier A to its receptive position after the bundles have been dumped.

To hold the bundle carrier A in its normal position I employ a catch 19 which is pivoted intermediate its ends to the sleeve 12 and is normally in engagement at one end with a tooth 12$^a$, on the sleeve 5, with which the catch is adapted to automatically engage by the tension of a spring 20 connected to the catch 19 and to the carrier support 7. A rod 21 is connected to the catch 19 and to a foot lever 22 which is pivotally mounted on the frame 1 convenient to the seat of the operator of the harvester. The bent end of the carrier support 7 extends below the sleeve 5 in which it is journaled, and has loosely mounted upon it below the sleeve a member 23 which is free to oscillate horizontally, its movement in one direction being limited by contact with the frame 1 or the casting 4, and its movement in the opposite direction being limited by a lug 24 on the sleeve 5 with which a lug 25 on the member 23 is adapted to contact when the bundle carrier is swung to dump the accumulated bundles.

Pivotally connected on the member 23 by a vertical pivot, and near the center thereof, is a bar 26 which extends through a horizontally disposed slot 27, in the free end of the member 23, and has its opposite end pivotally connected to an arm 28 which is secured to the finger bar 9 and extends downwardly and outwardly therefrom when the carrier A is in position for receiving bundles from a harvester. If a line be drawn from the axis of the sleeve 5 through the pivotal connection of the bar 26 with the arm 28 secured on the finger bar 9, it will be seen that the pivot point of the bar 26 on the member 23 is stubbleward of such a line, as shown in Fig. 5, and the bar 26 and member 23 are in angular relation to each other, the bar 26 contacting with the grainward wall of the slot 27, forming practically a lock joint which is materially strengthened by the weight of the bundles in the carrier A and which can only be broken by lateral pressure.

When the desired number of bundles have accumulated on the carrier A, and if it is desired to deposit them upon the ground, the operator of the machine actuates the catch 19 through the rod 21 so that the hook end thereof becomes disengaged from the tooth 12ª on the sleeve 5; continued pressure on the treadle or foot lever 22 starts the carrier A in its forward swing, which is accelerated by the weight of the bundles and a slightly forwardly inclined position of the bent portion of the carrier support 7. The bar 26 and member 23 swing simultaneously with the carrier until the lug 25 on the member 23 comes in contact with the stop or lug 24 on the sleeve 5 holding the member from further forward movement, the bar 26 however, continues to swing until the lock joint is broken and the lug 13 on the sleeve 12 comes in contact with the lug 14 on the sleeve 5 when the carrier is brought to a standstill; as the angular relation of the bar 26 and member 23 is broken, the latter is swung back in an opposite direction by pressure of the bar 26 which is moved longitudinally by the weight of the accumulated bundles on the carrier A, as the latter is rocked in its bearing on the support 7, until it is in the position shown in Fig. 2, and in dotted lines in Fig. 1. The operator of the harvester having released the foot lever when the carrier has reached the limit of its swing to deposit the bundles on the ground, the coil spring 17 exerts its tension to return the carrier A to its normal position at the rear of the machine; as the carrier A swings rearwardly the bar 26, pivots now on the member 23 which is in position against the frame 1 or the casting 4, and through the connection of the bar 26 to the arm 28 the carrier is rocked on the support 7, and at the termination of the rearward swing the carrier is again in position to receive bundles and the operative parts are as shown in full lines in Figs. 1 and 3.

What I claim is—

1. In a corn harvester having a binder, the combination of a main frame, a bundle carrier including a support pivoted on the main frame, a receiver pivotally journaled in a bearing on said support and adapted to receive bundles from the binder and carry them stubbleward, a member loosely mounted on said support, a bar pivoted on said member to form a lock joint therewith and pivotally connected with the receiver to hold the latter in a position to receive the bundles and carry them stubbleward, means to swing the support and receiver stubbleward to a predetermined position, and means to break said lock joint to permit the receiver to deposit the bundles upon the ground.

2. In a corn harvester having a binder, the combination of a main frame, a bundle carrier including a support pivoted on the main frame, a receiver pivotally journaled in a bearing on said support and adapted to receive bundles from the binder and carry them stubbleward, a member loosely mounted on said support, a bar pivoted on said member to form a lock joint therewith and pivotally connected with the receiver to hold the latter in a position to receive the bundles and carry them stubbleward, means to swing the support and receiver stubbleward to a predetermined position, means to break said lock joint to permit the receiver to deposit the bundles upon the ground, means to return said support and receiver to its initial position at the rear of the binder, said member and bar coöperating to raise the receiver to the position for receiving bundles and to reform the lock joint.

3. In a corn harvester having a binder, the combination of a main frame, a bundle carrier pivotally supported thereon to receive bundles from the binder and adapted to be swung stubbleward to deposit the bundles upon the ground, a member loosely mounted on said support, and a bar pivoted on said member to form a lock joint therewith and coöperating with said member to hold the receiver in position for receiving bundles and carrying them stubbleward, and means to break said lock joint as the receiver reaches the limit of its stubbleward movement.

4. In a corn harvester having a binder, the combination of a main frame, a bundle carrier pivotally supported thereon to receive bundles from the binder and adapted to be swung stubbleward to deposit the bundles on the ground, a member loosely mounted on said support and movable therewith when the latter is swung with the receiver to deposit the bundles, a bar pivoted on said member and extending grainward of the line of advance of the machine to connection with the receiver to hold the latter in position to receive bundles and carry them stubbleward, means to hold said bar and member in rigid relation one with the other when the receiver is in its receptive position, said means maintaining said rigid relation of the bar and said member for part of the swing of the carrier to deposit the bundles, means to check the movement of said member before the swing of the carrier is completed, the bar swinging on its pivot on said member and returning the latter to its original position by a longitudinal movement of said bar when the receiver is rocked to deposit the bundles.

In testimony whereof I affix my signature, in presence of two witnesses.

FREDERICK D. WILSON.

Witnesses:
W. G. DUFFIELD,
JESSIE SIMSER.

Copies of this patent may be obtained for five cents each, by addressing the "Commissioner of Patents, Washington, D C."